United States Patent
Steen

(10) Patent No.: US 11,167,529 B2
(45) Date of Patent: Nov. 9, 2021

(54) MULTI-LAYER, FLAT GLASS STRUCTURES

(71) Applicant: VAON, LLC, Bowling Green, KY (US)

(72) Inventor: Henry B. Steen, Bowling Green, KY (US)

(73) Assignee: VAON, LLC, Bowling Green, KY (US)

( * ) Notice: Subject to any disclaimer, the term of this patent is extended or adjusted under 35 U.S.C. 154(b) by 0 days.

(21) Appl. No.: 17/031,873

(22) Filed: Sep. 24, 2020

(65) Prior Publication Data

US 2021/0016548 A1   Jan. 21, 2021

Related U.S. Application Data

(62) Division of application No. 16/413,398, filed on May 15, 2019, now Pat. No. 10,821,707.

(60) Provisional application No. 62/672,735, filed on May 17, 2018.

(51) Int. Cl.
| | |
|---|---|
| *C03B 23/203* | (2006.01) |
| *B32B 17/06* | (2006.01) |
| *H04M 1/02* | (2006.01) |
| *G01N 30/60* | (2006.01) |
| *B32B 3/26* | (2006.01) |
| *B32B 38/00* | (2006.01) |
| *B32B 37/20* | (2006.01) |
| *C03B 23/24* | (2006.01) |
| *C03B 33/08* | (2006.01) |
| *G01N 30/02* | (2006.01) |

(52) U.S. Cl.
CPC .............. *B32B 17/06* (2013.01); *B32B 3/266* (2013.01); *B32B 37/20* (2013.01); *B32B 38/0004* (2013.01); *C03B 23/203* (2013.01); *C03B 23/245* (2013.01); *C03B 33/082* (2013.01); *G01N 30/60* (2013.01); *H04M 1/0202* (2013.01); *B32B 2457/00* (2013.01); *G01N 2030/025* (2013.01)

(58) Field of Classification Search
CPC ..... C03B 23/203; C03B 23/23; C03B 23/245; C03B 33/00–04; C03B 33/08–082; C03B 33/09–093; B01J 19/0093; B01J 19/32
See application file for complete search history.

(56) References Cited

U.S. PATENT DOCUMENTS

| | | | | |
|---|---|---|---|---|
| 3,811,474 A | * | 5/1974 | Bauer ....................... | F15C 5/00 137/833 |
| 5,344,545 A | * | 9/1994 | Tsukada ................ | B01J 19/0093 204/414 |
| 5,565,729 A | * | 10/1996 | Faris ..................... | B01J 19/0093 313/103 CM |
| 5,882,465 A | * | 3/1999 | McReynolds ....... | B32B 37/1018 156/285 |

(Continued)

OTHER PUBLICATIONS

Yalikun et. al. (Yalikun, Y., Hosokawa, Y. Lino, t., Tanaka, Y., Lab Chip, 2016,16, 2427-2433).*

(Continued)

*Primary Examiner* — Jason L Lazorcik
(74) *Attorney, Agent, or Firm* — 21st Century IP LLC; Kelly Hollowell

(57) ABSTRACT

The present invention generally relates to multi-layer, flat glass structures and a method of manufacturing multi-layer, flat glass structures.

14 Claims, 9 Drawing Sheets

(56) References Cited

U.S. PATENT DOCUMENTS

| | | | | |
|---|---|---|---|---|
| 6,082,140 | A * | 7/2000 | Ackler | C03B 23/203 156/104 |
| 6,131,410 | A * | 10/2000 | Swierkowski | C03B 23/203 65/36 |
| 6,205,819 | B1 * | 3/2001 | Ackler | C03B 23/203 156/104 |
| 6,255,741 | B1 | 7/2001 | Yoshihara et al. | |
| 6,595,232 | B2 * | 7/2003 | Guzman | B81C 1/00071 137/15.01 |
| 6,648,015 | B1 * | 11/2003 | Chow | B01J 19/0093 137/551 |
| 7,677,058 | B2 * | 3/2010 | Hawtof | C03B 19/1492 65/17.4 |
| 2002/0001695 | A1 * | 1/2002 | Tajima | B81C 1/00071 428/138 |
| 2004/0245521 | A1 * | 12/2004 | Faris | B81C 1/00071 257/40 |
| 2005/0067292 | A1 * | 3/2005 | Thompson | B81C 1/00373 205/118 |
| 2010/0294748 | A1 * | 11/2010 | Garner | C03B 33/091 219/121.72 |
| 2011/0023548 | A1 * | 2/2011 | Garner | B32B 37/142 65/106 |
| 2012/0142144 | A1 | 6/2012 | Taheri | |
| 2013/0105921 | A1 | 5/2013 | Najafi et al. | |
| 2013/0112650 | A1 * | 5/2013 | Karam | B23K 26/082 216/13 |
| 2013/0223922 | A1 | 8/2013 | Koval et al. | |
| 2014/0061207 | A1 | 3/2014 | Kloft et al. | |
| 2014/0130649 | A1 * | 5/2014 | Chang | B65G 49/065 83/26 |
| 2014/0319628 | A1 | 10/2014 | Nakane et al. | |
| 2015/0001651 | A1 | 1/2015 | Faralli et al. | |
| 2015/0140735 | A1 * | 5/2015 | Hosseini | B23K 26/0624 438/107 |
| 2015/0218034 | A1 * | 8/2015 | Bigelow | C03B 33/0235 156/271 |
| 2015/0224744 | A1 * | 8/2015 | Neuhaeusler | B32B 3/16 206/454 |
| 2015/0251944 | A1 * | 9/2015 | Brackley | B26D 7/32 83/23 |
| 2015/0290711 | A1 | 10/2015 | Fabrisonics | |
| 2016/0156065 | A1 * | 6/2016 | Visco | C03C 3/321 429/322 |
| 2016/0272532 | A1 * | 9/2016 | Fujii | C03B 33/082 |
| 2017/0008122 | A1 * | 1/2017 | Wieland | B32B 17/06 |
| 2018/0016179 | A1 * | 1/2018 | Canfield | B32B 7/06 |
| 2018/0086664 | A1 * | 3/2018 | Steen | B81B 7/0058 |
| 2018/0215611 | A1 * | 8/2018 | Steen | B32B 3/266 |
| 2018/0237325 | A1 * | 8/2018 | Li | C03B 17/02 |
| 2019/0270663 | A1 * | 9/2019 | Murashige | B32B 7/12 |
| 2019/0292086 | A1 * | 9/2019 | Murashige | C03B 33/091 |

OTHER PUBLICATIONS

Plichta, Armin et al., Flexible Glass Substrates, Flexible Flat Panel Displays, 2005, Chapter 3, pp. 35-55, John Wiley Sons, Ltd.

Wlodarczyk, Krystian, et al., Picosecond Laser Cutting and Drilling of Thin Flex Glass, Optics and Lasers in Engineering 2016, 78, 64-74.

* cited by examiner

MULTI-LAYER, FLAT GLASS STRUCTURES

FIELD OF THE INVENTION

The present invention generally relates to multi-layer, flat glass structures and a method of manufacturing multi-layer glass flat structures. This application is a Divisional of U.S. application Ser. No. 16/413,398 filed May 15, 2019, which claims benefit to provisional patent application No. 62/672,735 filed on May 17, 2018, the contents of which are incorporated herein by reference in their entirety for all purposes.

BACKGROUND OF THE INVENTION

Glass is inert and easier to clean than metal and plastic. It provides a surface that is smoother than metal and plastic. Due to its inherent transparency, light can shine into and through a glass device.

However, constructing glass devices from multiple layers of glass has been a manufacturing challenge due to the difficulty of adhering multiple layers of glass together both efficiently and with high precision. Typically, a glue of some type is needed (e.g. glass frit) or high temperature fusion is required. Either of these "gluing" methods introduce manufacturing errors, are inherently slow (e.g., heat cycling can be time consuming), and do not allow for complex internal 3D geometries to be formed by and/or in the glass or delicate equipment (e.g., printed circuit board) to be housed within the structure.

It would be beneficial to be able to manufacture multi-layer, flat glass structures that take advantage of the inherent properties of glass (e.g., inertness and transparency) but avoid the inconsistencies of glass manufacturing.

SUMMARY OF THE INVENTION

In another aspect, the present invention provides a novel, multi-layer, flat glass structure.

In another aspect, the present invention provides a novel method of manufacturing multi-layer, flat glass structures.

In another aspect, the present invention provides a novel, cylindrical multi-layer, flat glass structure.

In another aspect, the present invention provides a novel method of manufacturing cylindrical, multi-layer, flat glass structures.

These and other aspects, which will become apparent during the following detailed description, have been achieved by the inventors' discovery of a new method of manufacturing multi-layer, flat glass structures.

DETAILED DESCRIPTION OF THE INVENTION

Figure 1:
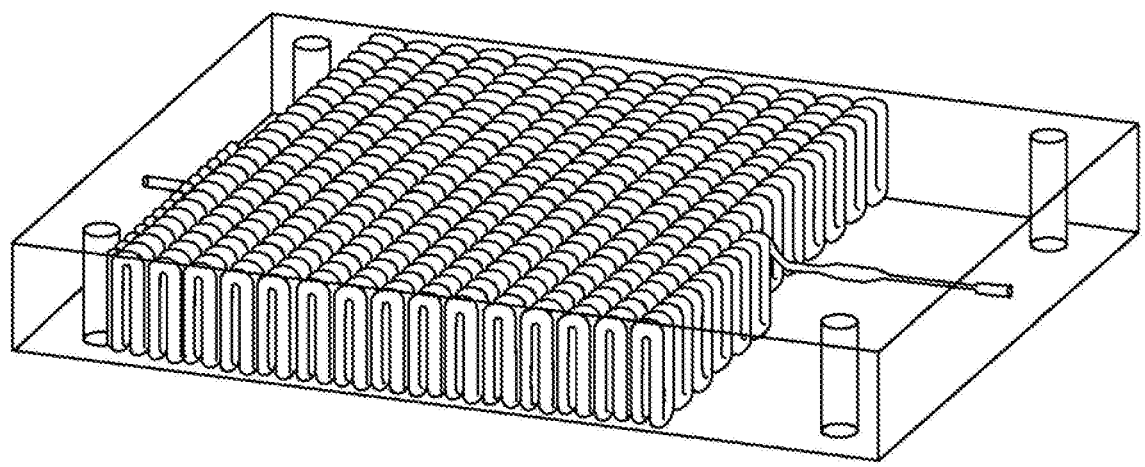
FIG. 1 shows a tilted view of a multi-layer, flat glass structure wherein a linear gas chromatography (GC) column is formed from the glass.
Figure 2:
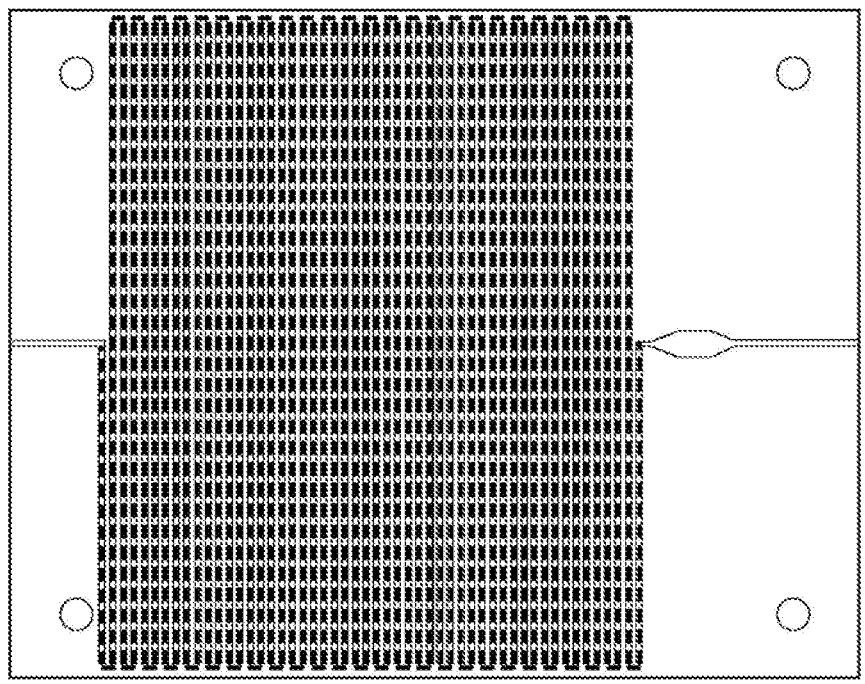
FIG. 2 shows a top view of a multi-layer, flat glass structure wherein a linear GC column is formed from the glass.

It has now been discovered that specific types of flat glass can be quickly laser cut, stacked, and formed into multi-layer, flat glass structures. These structures can be functional (e.g., designed for fluids to flow through them), and/or can house entire instruments or components thereof (e.g., mobiles phones, sensors, batteries, circuit boards, etc.). Because the structures can be transparent or translucent one can take advantage of the ability to direct light (e.g., UV light) into and/or through them.

Glass: Glass refers to a substance typically formed by melting sand, sodium carbonate (soda), and calcium oxide (lime)(silicate glass). The glass can also be formed with $B_2O_3$ and/or $Al_2O_3$ to form borosilicate, aluminosilicate or alumino-borosilicate glass. Additional additives can also be included during the formation of the glass or afterwards (e.g., polymer or metal oxide coatings). The glass can be transparent, translucent, or opaque. For translucent or opaque, the glass can be formed with this property. Alternatively, the glass can be modified to be translucent or opaque. Examples of modification include the addition of a translucent or opaque layer (e.g., a coating on one or both sides of one or more glass layers). The glass can be made or modified such that it reflects (in or out) and/or filters (in or out) certain wavelengths of light. In another aspect, a modified glass layer can further comprise another glass layer (e.g., to sandwich a coating to protect and/or enhance the modification).

Flat: Flat refers to both the geometry and the roughness of the glass. The flat glass used in the present invention is both planar (geometry) and smooth (roughness). Planar means that the top and bottom of each layer is in the same geometric plane. The flat glass has length, width, and thickness (height), with the thickness being very small (see examples of thickness below). Roughness is defined via a roughness average (Ra) and peak-to-valley roughness (Rpv). Examples of the roughness average (Ra) of the flat glass include less than 5, 4, 3, 2, 1, 0.9, 0.8, 0.7, 0.6, 0.5, 0.4, 0.3, 0.2, and 0.1 nm. Examples of peak-to-valley roughness (Rpv) include less than 50, 45, 40, 35, 30, 25, 20, 15, 10, and 5 nm.

When the structure is cylindrical, the flat glass is a plane curve (e.g., the flexible glass has wound around a spool).

Examples of the thickness of the flat glass include 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, to 225 μm, or greater.

As an example, the presently claimed invention uses glass that is stable to at least 600° C. Other examples of the temperature at which the glass remains stable includes 625, 650, 675, 700, 725, 750, 775, and 800° C.

Typically, the glass used in the present invention is flexible. For example, the glass is bendable or capable of forming a curved structure without shattering (e.g., a non-brittle substance). This allows for the glass to be formed into rolls (e.g., see FIG. 10), which can be unwound and cut during the present manufacturing process.

Examples of commercially available flat glass useful in the present invention include ultra-thin glass from Schott (e.g., AF 32® eco and AF 32® eco) as well as Corning® Willow® glass.

An advantage of the present structures is that they form what is essentially a solid block (or cylinder) of hermetically sealed glass. The solid block (or cylinder) is sturdy and is resistant to numerous environmental challenges (freezing temperatures, high temperatures, precipitation, submersion in water, etc.).

In an aspect, the present invention provides a novel multi-layer, flat glass structure: comprising:
  a top flat glass layer;
  a bottom flat glass layer; and,
  at least four (4) internal flat glass layers;
  wherein:
  the internal flat glass layers are each, individually, in contact with two other flat glass layers and the top and bottom flat glass layers are each, independently, in contact with one internal flat glass layer;
  the structure has a top, bottom, and four sides; and,
  at least one portion of glass (cut-out) is missing from a plurality of the layers.

In another aspect, a plurality of portions of glass (cut-outs) are missing from a plurality of the layers. In another aspect, a plurality of the missing glass portions in the plurality of layers are aligned to form a channel(s)(e.g., via) and/or a chamber(s).

In another aspect, the structure, comprises: at least 10 layers.

In another aspect, the structure, comprises: at least 50 layers.

In another aspect, the structure, comprises: at least 100 layers.

The number of flat glass layers (the total of top, bottom, and internal) is only limited by the design of the structures, specifically their thickness (height). Examples include 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 220, 240, 260, 280, 300, 320, 340, 360, 380, 400, 420, 440, 460, 480, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, and 2000. Examples also include: (a) 10-2000, (b) 10-1000, (c) 100-2000, (d) 100-1000, and (e) 100-500.

The geometry of the structures can vary depending on the function of the structure and/or the function of the components housed by the structure. In another aspect, the structure is a quadrilateral. Examples of quadrilaterals include square, rectangular, rhombus, parallelogram, trapezoid, and kite (adjacent pairs of equal length sides). In another aspect, the structure is round. Examples of round structures include circular, oblong, and egg-shaped. In another aspect, the structure is a combination of part quadrilateral and par round. An example of the combination geometry is a structure that is round on one end and square or rectangular on the other.

In another aspect, the structure, further comprises: a plurality of fluid ports. The ports allow for gases and/or liquids to be introduced into and flow through the structure. Examples of the number of ports include 2, 3, 4, 5, 6, 7, 8, 9, and 10. The ports are connected to an internal structure (e.g., glass channel) for the gas or liquid to flow into and through. This is useful when the structure houses a sensor (e.g., a gas sensor or plurality of gas sensors) or functions as a gas chromatograph (GC) column. In another aspect, the ports allow for external tubing or connectors to be inserted into and/or connected with the structure. For internal connection, external tubing is plugged into the structure. The ports can be the glass of the structure itself or can be a non-flat glass connecter that is affixed to the inside of the structure. For glass ports, they can be formed in the structure during manufacture. Alternatively, ports can be formed (e.g., drilled) after the structure has been made. For external connection, a connector can affixed (e.g., glued, fused, or mechanically attached) to the structure thereby allowing a connection that is external to the structure. Attachment of the external connector can occur during the stacking of the layers or after the structure has been made.

In another aspect, the structure, further comprises: electrical connectors. Examples of the number of electrical connectors include 2, 3, 4, 5, 6, 7, 8, 9, and 10. As an example, the connectors are electrical ports than can allow an electrical device (e.g., cable or wire) to be plugged into the structure. Another example of electrical connectors is external conducting pins (e.g., gold or gold plated pins) that extend from the inside of the structure to the outside of the structure, thereby allowing for clipping, crimping, plugging, or other ways of electrical connection.

Electrical connectors as well as electrical components housed (partially or fully) in the structure are typically electronically connected to one another via internal electronic connections. Examples of these connections include wires, traces, solder, and combinations thereof. Vias are cut during the manufacturing process to allow for the electronic connections to be made. The internal (and external, if present) electrical connections are inserted/laid/deposited during the manufacturing process or after the structure has been made. As an example, an electrical port can also be a glass inlet with a wire, trace, or solder located inside or close enough to electronically communicate with a plug inserted therein.

In another aspect, the structure, further comprises: a plurality of mechanical pins. These mechanical pins pass through the internal layers of the glass-sensor and at least into the top and bottom layers. Optionally, one or more of the mechanical pins pass through at least one of the top or bottom layers and extend beyond the structure. The mechanical pins can be used to mount the structure (e.g., attach the structure to a vehicle or a computer case). The mechanical pins can also be screws or bolts or other types of fasteners. The mechanical pins can also be electrically conductive.

In another aspect, the mechanical pins are electrically conductive and are in electrical connection with at least one component housed in the structure.

In another aspect, the plurality of mechanical pins extends beyond the bottom and/or top of the structure, are electrically conductive, and are in electrical connection with at least one of component housed in the structure.

In another aspect, the structure is a gas chromatography (GC) column and, further comprises:
 a. an inlet port (see left-hand side of FIG. 1, and FIG. 13-FIG. 15 (1200)),
 b. an outlet port (e.g., see right-hand side of FIG. 1, and FIG. 13-FIG. 15 (1210)), and
 c. a glass column (see central portion of FIG. 1, and FIG. 13-FIG. 15 (1100)).

Figure 3:
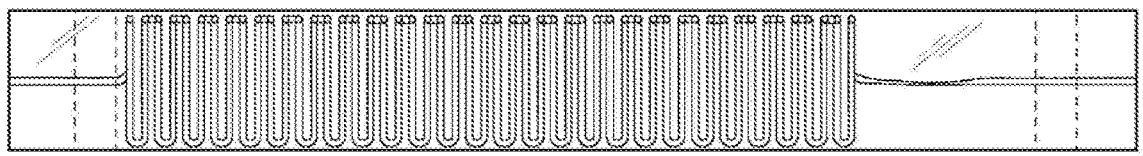
FIG. 3 shows a side view of a multi-layer, flat glass structure wherein a linear GC column is formed from the glass.
Figure 4:
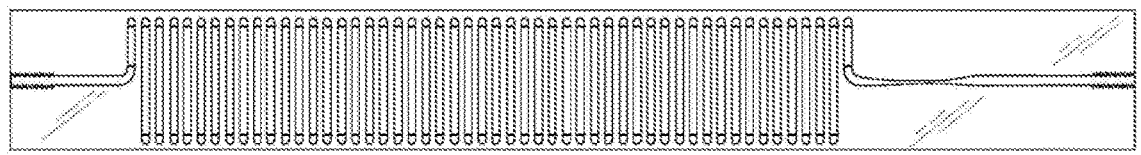
FIG. 4 shows a cut-away side view of a multi-layer, flat glass structure wherein a linear GC column is formed from the glass.
Figure 5:
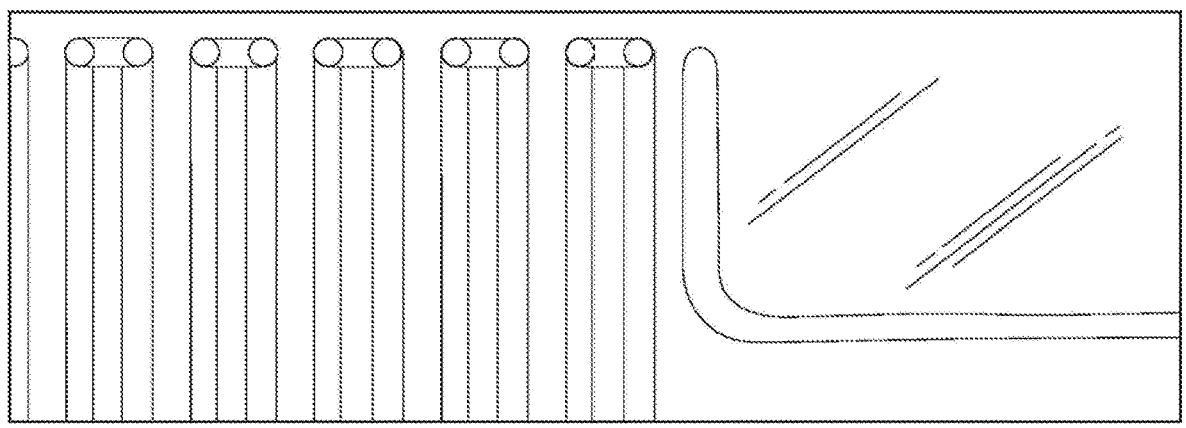
FIG. 5 shows an expanded cut-away side view of a multi-layer, flat glass structure wherein a linear GC column is formed from the glass.

In FIG. 1, the column is formed via a pathway in the internal layers. This can be seen more clearly in FIGS. 3-5, wherein the side views show that the column runs up and down the height of the glass structure. At least the top and bottom layers house but do not contain the column. Additional internal layers adjacent to the top and/or bottom layers can also house, but not contain the column. The remaining inner layers have been cut (comprise missing portions or cut outs) so that when stacked a continuous glass channel (column) is formed.

Figure 6:
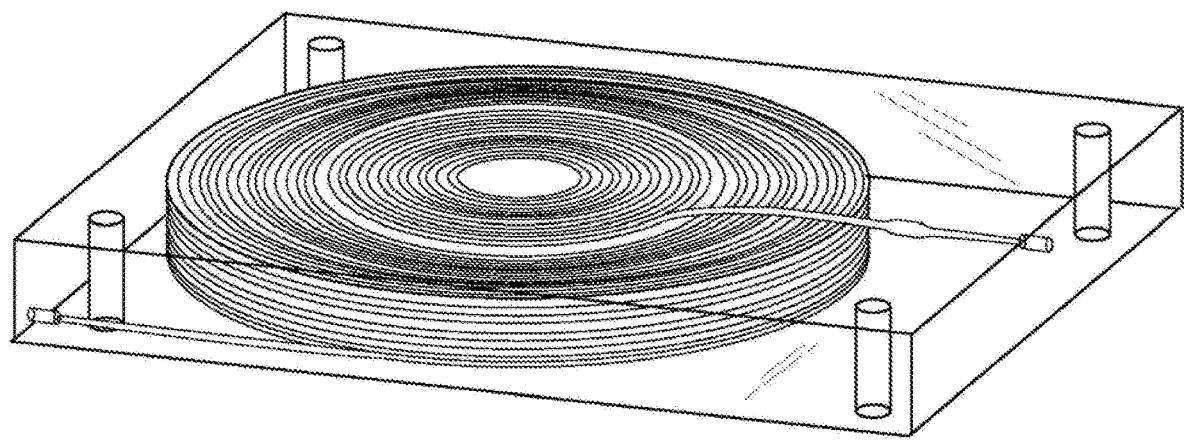
FIG. 6 shows a tilted view of a multi-layer, flat, glass structure wherein a spiral GC column is formed from the glass.
Figure 7:
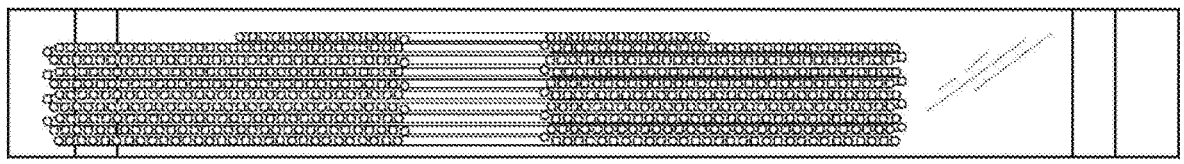
FIG. 7 shows a side view of a multi-layer, flat glass structure wherein a spiral GC column is formed from the glass.
Figure 8:
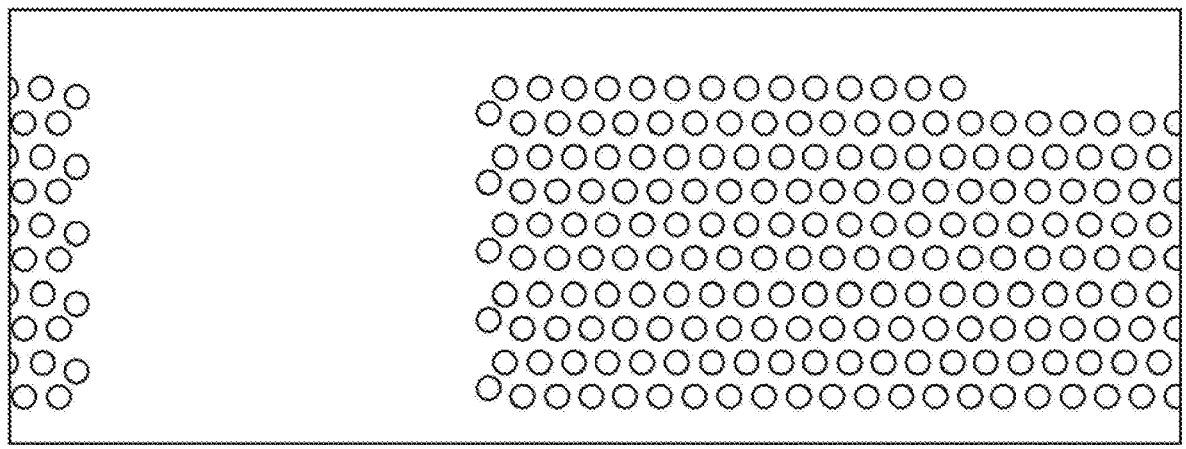
FIG. 8 shows an expanded cut-away side view of a multi-layer, flat glass structure wherein a spiral GC column is formed from the glass.
Figure 9:
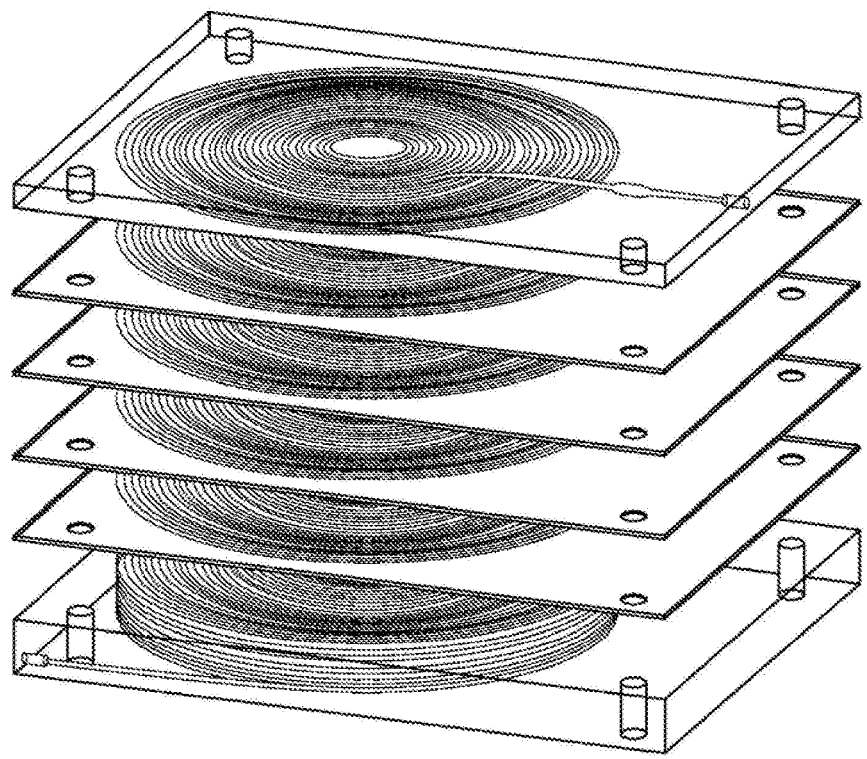
FIG. 9 shows an exploded tilted of a multi-layer, flat glass structure wherein a spiral GC column is formed from the glass.

The column in more than one geometry. A linear column is shown in FIGS. 1-5. FIG. 6 shows an alternative geometry, a spiral column. FIGS. 7-9 show an example of how the spiral column is formed by the internal layers.

Typical column lengths for GC columns are 30 m and 60 m. Due to the ease of manufacturing the present GC columns, the column length is easily adjusted. Examples include 10, 15, 20, 25, 30, 35, 40, 45, 50, 55, 60, 65, 70, 75, 80, 85, 90, 95 and 100 m.

The internal diameter (I.D.) of the column is also variable as it is set by the laser cut. Examples of the column I.D. include 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, and 0.80 mm.

One of the advantages of the present invention is the ability to rapidly and precisely manufacture small, functional, multi-layer, flat glass structures. These structures can avoid the need for tubing, connectors, and other parts that the glass can function as or for which the need is removed. For example, the GC structure in FIG. 1 can be 63.5 mm wide, 80 mm long, and 10 mm high. Other dimensions are possible. The length of the structure in FIG. 1 is determined by how much glass is cut off from the starting roll. The height is determined by the number of flat glass layers that are stacked and fused together. The width is usually set by the width of the roll. However, the width could be narrower than the roll if desired (e.g., one or both edges could be removed during manufacture). Alternatively, the width is determined by how much glass is cut off from the roll and the length corresponds to the width of the roll.

In another aspect, the GC column structure, further comprises: a detector. The structure can comprise a detector (see the sensor just to the right of the column in FIG. 1) or can be connected to the detector via the outlet port (not shown).

The GC detector can be a sensor such as those described in WO 2017/165567, WO 2018/160650, U.S. Pat. No. 10,132,769, US Patent Publication No. 2018/0086664, and US Patent Publication No. 2018/0215611. the contents of which are incorporated by reference, in their entirety. Alternatively, the GC detector can be selected from: (a) flame ionization detector (FID), thermal conductive detector (TCD), akali flame detector (AFD), alkali flame ionization detector (AFID), catalytic combustion detector (CCD), flame photometric detector (FPD), electron capture detector (ECD), and combinations thereof (e.g., TCD in sequence with an FID). The detector can also be a spectrometer such as a mass spectrometer (MS) or NMR (nuclear magnetic resonance spectrometer), or a combination (e.g., GC-MS, GC-NMR, or GC-MS-NMR).

In another aspect, the structure is a cellular phone and, further comprises:
 a. a display (e.g., an LCD or LED display);
 b. a battery (e.g., a lithium-ion battery);
 c. a system on a chip (e.g., CPU (central processing unit), GPU (graphics processing unit), modem (e.g., LTE or 5G), and processors (e.g., display and video);
 d. memory (e.g., RAM (random access memory) and flash drive);
 e. a camera or a plurality of cameras (e.g., two (allows for front and rear facing));
 f. a plurality of sensors (e.g., accelerometer, gyroscope, digital compass, ambient light sensor, and proximity sensor);
 g. a speaker; and,
 h. a microphone.

The various components of the cellular phone can be in one chamber formed by cut-outs in the layers (inner, bottom, and/or top layers) or in a plurality of chambers. If a plurality of chambers, these can be connected (e.g., via a passageway or electronically) or isolated from one another.

If the structure houses or is an integral part of a complex device, such as a cellular phone, then it optionally comprises: a plurality of multi-layer, flat glass structures. Examples of the number of structures include 2, 3, 4, 5, 6, 7, 8, 9, and 10. Various components of the device can be formed in one structure or another. The plurality of structures can then be fused together. If it is necessary to be able to open the structure to repair or replace components (e.g., faulty battery), the plurality of structures can be mechanically connected (e.g., corner clips, screws, bolt, or mechanical snaps). To prevent fusion of two structures, a spacer (e.g., rubber gasket) can be used between the two structures.

In another aspect, the structure is a self-contained environmental (e.g. gas) sensor and, further comprises:
 a. a sensor (e.g., gas or liquid sensor);
 b. a battery;
 c. a transmitter;
 d. a receiver; and,
 e. a system on a chip (e.g., processor and memory).

The environmental sensor can be used to monitor the presence of chemicals (e.g., gases) in remote environments or in agricultural fields or buildings. In an example, the battery is solar rechargeable or is long-lived battery designed to last for 20 or more years.

In another aspect, the self-contained environmental sensor unit, further comprises:
 f. a plurality of fluid ports.

The ports are designed to allow gases and/or liquids to reach the sensor but the rest of the components of the sensor are typically sealed off from the environment.

Examples of sensors that can be used in the self-contained environmental sensor unit include those described in WO 2017/165567, WO 2018/160650, U.S. Pat. No. 10,132,769, US Patent Publication No. 2018/0086664, and US Patent Publication No. 2018/0215611, the contents of which are incorporated by reference, in their entirety.

In another aspect, the structure is a radiation sensitive beacon and, further comprises:
a. a radiation sensor;
b. a battery;
c a transmitter, and,
d. a system on a chip (e.g., processor and memory).

In another aspect, the structure, further comprises:
a. an integrated circuit.

In this aspect, at least one of layers (typically an internal layer) is a substrate (platform) on which an integrated circuit is built. In order to speed up the manufacturing of this type of structure, the integrated circuit layer can be pre-made and inserted into the stacking process (see below for more detail).

In addition to the components described above that are housed (fully or partially) by the structure, other examples include gears, motors, machines or mechanical devices (e.g., workings of a watch) solar cells, and containers (to house components).

In another example, the structure is a plug-and-play (PnP) device. Plug-and-play refers to capacity for the structure to be plugged directly into a socket or port of a larger device. The socket typically allows for an electronic connection between the structure and device as well as mechanically holding the structure. The plug and socket are both electrically compatible and software compatible if data is to be delivered to and/or from the structure. Examples of PnP devices include hard drives (e.g., flash drives) for computers and/or mobile devices, sensors for mobile devices (e.g., an internal or external alcohol sensor for a mobile phone), sensors for a weather station (e.g., temperature, light, pressure, and humidity), and GC column (with or without an internal sensor).

In another aspect, the structure is transparent (detailed shapes can be seen through the structure, looking top to bottom or vice versa).

In another aspect, the structure is translucent (shapes can be seen, but detailed shapes cannot be seen through the structure, looking top to bottom or vice versa). For example, one or more of the flat glass layers (e.g., top, bottom and/or an internal layer(s)) are translucent prior to assembly of the structure. In an example, at least one of the top and bottom layers are translucent. In another example, both the top and bottom layers are translucent. In another example, at least one internal layer is translucent. In another example, two or more internal layers are translucent. In another example, only part of the structure is translucent In another aspect, the structure is opaque (shapes cannot be seen through the structure, looking top to bottom or vice versa).

In another aspect, at least one layer of the structure, further comprises. a reflective coating. The reflective coating can be on the outside of the structure (e.g., on the top or bottom or both) or can be on one or more of the internal layers.

Methods

In another aspect, the present invention provides a novel method of manufacturing a multi-layer, flat glass structure, the method, comprising:
(a) unrolling a spool of flat glass to provide a first length of flat glass;
(b) cutting the first length of glass away from the spool to form a bottom layer of flat glass, wherein the cutting optionally includes cutting a desired pattern into the first length of glass;
(c) placing the bottom layer of flat glass into an alignment frame;
(d) unrolling the spool to provide a second length of flat glass;
(e) cutting the second length of glass away from the spool to form an internal layer of flat glass, wherein the cutting optionally includes cutting a desired pattern into the second length of glass;
(f) placing the internal layer of flat glass into the alignment frame and in contact with the bottom layer;
(g) repeating steps (d)-(f) for each internal layer of flat glass, wherein each additional internal layer is placed in contact with another internal layer;
(h) unrolling the spool to provide a last length of flat glass;
(i) cutting the last length of glass away from the spool to form a top layer of flat glass, wherein the cutting optionally includes cutting a desired pattern into the last length of glass;
(j) placing the top layer of flat glass into the alignment frame and in contact with an internal layer; and,
(k) fusing the stacked glass layers to form a multi-layer, flat glass structure.

Cutting of the flat glass layers is typically done via laser. Using a laser allows for precision, accuracy, and speed. The pieces cut out drop away as the glass layer is moved. Optionally, mechanical force (e.g., agitation, twisting, or forced air) is applied to the cut layer to ensure all unwanted glass pieces drop away.

In another aspect, at least one alignment hole is cut into each layer. Examples of the number of alignment holes include 1, 2, 3, and 4. The alignment hole(s) allows for a light to shine through each layer to ensure precise alignment. Alternatively, an alignment post (or posts) can be used and each layer can be stacked onto the alignment post (or posts) via the alignment hole(s). In this aspect, the alignment frame, comprises: at least one alignment post.

Figure 10:
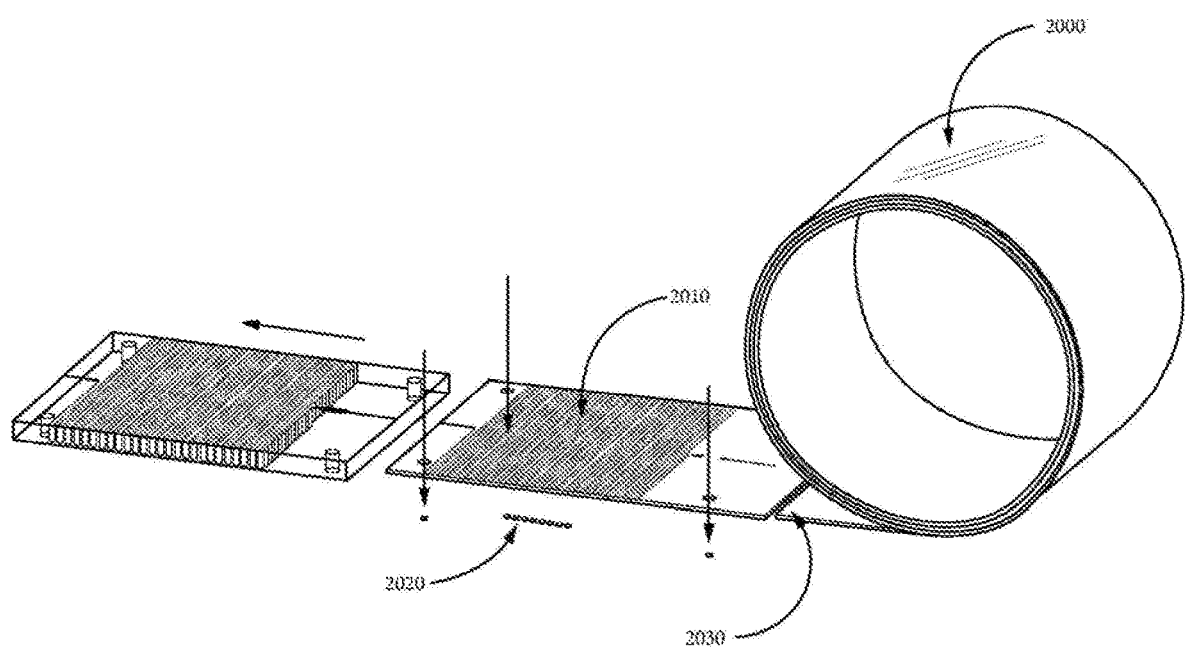
FIG. 10 shows a partially formed multi-layer, flat glass structure wherein a linear GC column is formed from the glass.
Figure 11:
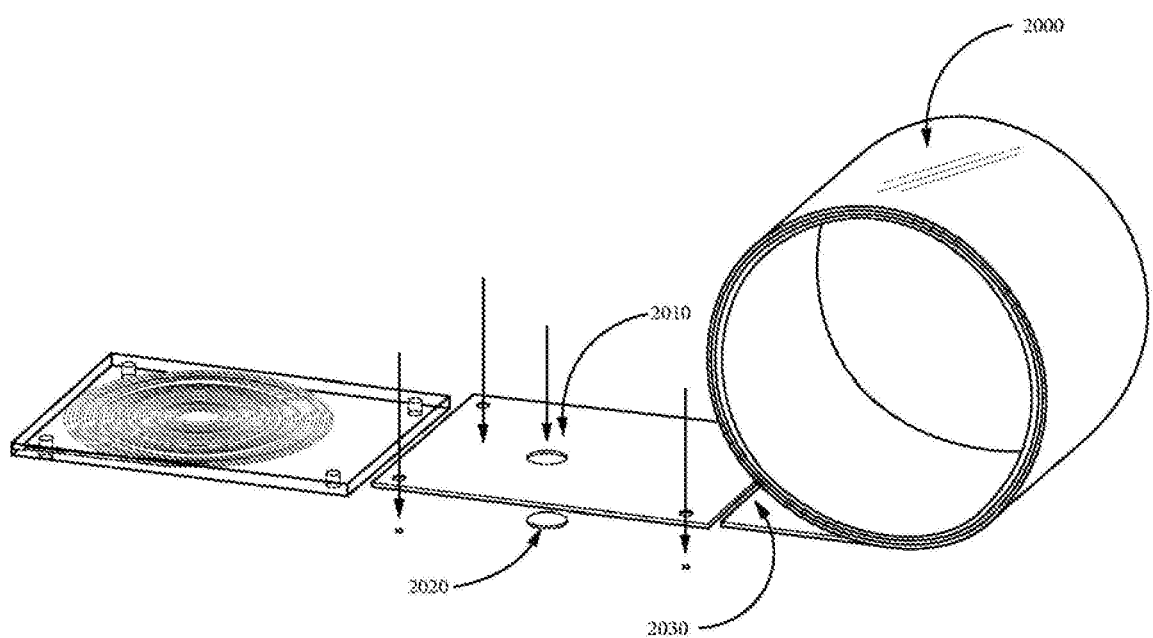
FIG. 11 shows a partially formed multi-layer, flat glass structure wherein a spiral GC column is formed from the glass.

FIG. 10 shows a partially formed flat glass structure that if forming a linear GC column. As can be seen in this figure, flat glass has been unwound from a spool of glass 2000, a laser pattern 2010 has been formed, the cut-outs 2020 have dropped away, a cut line 2030 has been made (see the line near the glass spool), and layers have been stacked. The process shown in FIG. 10 is repeated until the desired number of layers have been cut and stacked. FIG. 11 shows how a spiral column is formed.

One of the advantages of the present manufacturing process is that each layer can be patterned the same or differently from other layers. The process can be automated by pre-programming the pattern into a computer-controlled laser. The unrolling, cutting, stacking, etc. can all be automated, thereby allowing for high-speed, precision manufacturing of the present flat-glass structures.

In another aspect, fusing is performed using ultrasound and/or applying pressure.

In another aspect, the fusing step is performed by pressing the layers of the structure together with enough pressure that the layers fuse (adhere) to one another. In another aspect, the integrity of the stack is maintained by the alignment frame while pressure is applied. This is to ensure that the layers remain aligned, which can be important if channels or other structures are formed by the stacking.

In another aspect, pressure is applied to the partially completed structure to limit the amount of pressure required to fuse the entire structure. For example, pressure can be applied after every 5, 10, 15, 20, 25, 30, 35, 40, 45, or 50 layers have been stacked.

In another aspect, the top layer is cut and stacked first and the bottom layer is cut and stacked last. This would be building the structure from the top up as opposed to the bottom up process described above.

In another aspect, the optional pattern cutting and cutting a length of flat glass away from the spool can be done simultaneously, sequentially (e.g., from one side to another), or in parts or segments.

As described above, the present multi-layer glass structures can comprise various components (e.g., sensors, batteries, and wiring). One way to include components in the structure is to add them as the layers of glass are stacked. The patterns created in the glass layers can result in cavities/openings as layers are stacked. The cavities/openings allow for components to be installed during stacking.

In another aspect, the method, further comprises:

(l) installing one or more components into a cavity formed by at one or more internal layers.

This installing step can occur at any time during the stacking of internal layers (or before or after if the top and/or bottom layer has a cut-out in it). It can also occur multiple times in order to assemble a multi-component system. Cavity includes individual or multiple small holes (e.g., channel(s) and via(s)) and individual or multiple larger cut-outs (e.g., circular, square, and rectangular openings), which can form a chamber(s). For example, the battery of a cellular phone could be located near the bottom of the structure and an LED screen could be located at the top of the structure. The battery would be installed before the LED in a bottom up build (and vice versa). Electrical contacts, wiring, etc. could be installed throughout the stacking process (multiple installing steps). Fusing of the glass structure could occur before each component is installed (multiple fusing steps), after each component is installed (multiple fusing steps), or after the stacking is complete (one fusing step).

In another aspect, the method, further comprises:

(m) placing a first modified layer onto the tack.

In this aspect, a flat glass layer is modified before or during the manufacturing process and placed onto the stack as the structure is made. This allows one to maintain a high speed process without stopping to modify a layer (e.g., deposit metal traces). The layer to be modified can come from the same flat glass roll being used to form the structure, from a different roll, or a different source (e.g., a large sheet onto which a plurality of modifications is made). Examples of the modifications include building an integrated circuit on a glass layer and forming metal traces onto the layer (e.g., metal deposition or via an etching method). By having a supply of modified layers on hand, structures can be rapidly made with the modified layer (or layers) being placed on the stack at the appropriate time (first (top/bottom), last (top/bottom), or somewhere in the middle).

In another aspect, the method, further comprises:

(n) placing a plurality of modified layers onto the stack.

Examples of the number of modified layers in this aspect include 2, 3, 4, 5, 6, 7, 8, 9, 10, 11, 12, 13, 14, 15, 16, 17, 18, 19, and 20.

In another aspect, a plurality of rolls is used to form the structure. For example, a first roll can be used, followed by a second, then optionally a third, etc. Examples of the number of different rolls include 2, 3, 4, 5, 6, 7, 8, 9, 10. In another aspect, a plurality of rolls is used simultaneously. In this example, the layers are fed onto the stack from different directions (e.g., the stack is located midway between two rolls). One or more layers can be fed from one roll and then the other (e.g., alternating). In another example, just the top and bottom layers are fed from one roll and the internal layers are fed from the other. The more rolls used, the more specialized each roll can be (a top roll, a bottom roll, an opaque roll, a mirrored roll, a roll comprising metal traces, etc.).

Partial (Plurality of) Structures

It may be advantageous to form the multi-layer glass structure in two or more parts (e.g., a top portion (or half) and a bottom portion (or half) or top, middle(s), and bottom portions). In this aspect, the method of manufacturing forms partial, independent structures. These partial structures will still comprise a top layer, at least one internal layer, and a bottom layer. However, only one of the partial structures will have the top layer of the final structure and only one will have the bottom layer of the final structure.

Typically, the separate portions would each be fused prior to joining. The portions (e.g., top and bottom or top, middle(s), and bottom) can be of the same or different heights, depending on the components ultimately housed by the structure. By forming the glass structure as two or more portions, at least one component can be encased in the structure by placing the component(s) into (onto) one portion and then bringing the other portion into contact and fusing the newly contacted glass layers. As an example, a radiation sensitive beacon (e.g., sensor, battery, and transmitter) could be enclosed in a multi-layer glass structure by first forming a top half and bottom half, placing the beacon between the halves, and then fusing the halves together. As noted above, if it is necessary to be able to open the structure to repair or replace components (e.g., faulty battery), the plurality of structures can be mechanically connected (e.g., corner clips, screws, bolts, mechanical snaps, etc.). To prevent fusion of two structures, a spacer (e.g., rubber gasket) can be used between the two structures.

In another aspect, the layers of each portion are of the same thickness.

In another aspect, the structure is formed from a plurality of portions. In another aspect, the thickness of glass in each portion in the plurality are the same. In another aspect, the thickness of glass in at least two portions is different.

In another aspect, the structure is formed from a top portion and a bottom portion.

In another aspect, the structure is formed from a top portion, a middle portion, and a bottom portion.

In another aspect, the structure is formed from a top portion, at least two middle portions, and a bottom portion.

In another aspect, the final structure comprises at least one spacer.

Cylindrical Structures

Figure 13:
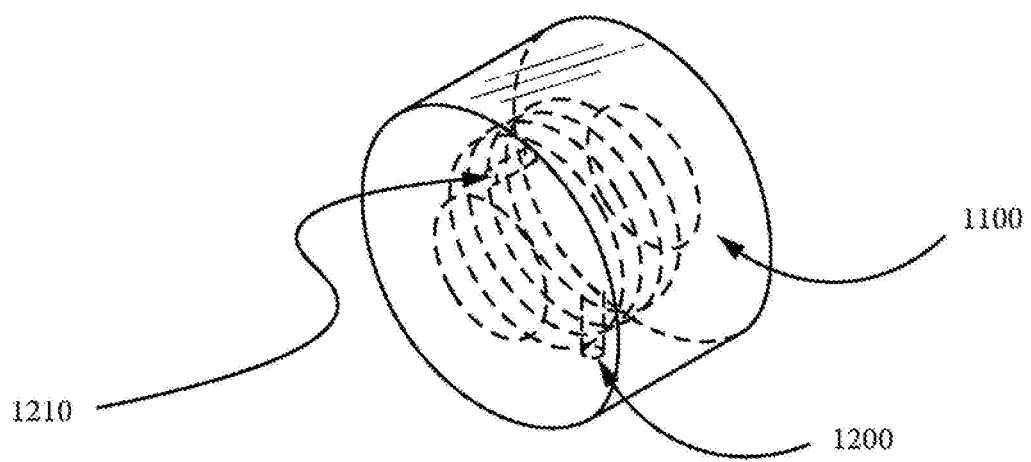
FIG. 13 shows a titled view of a cylindrical, multi-layer, flat glass structure.
Figure 14:
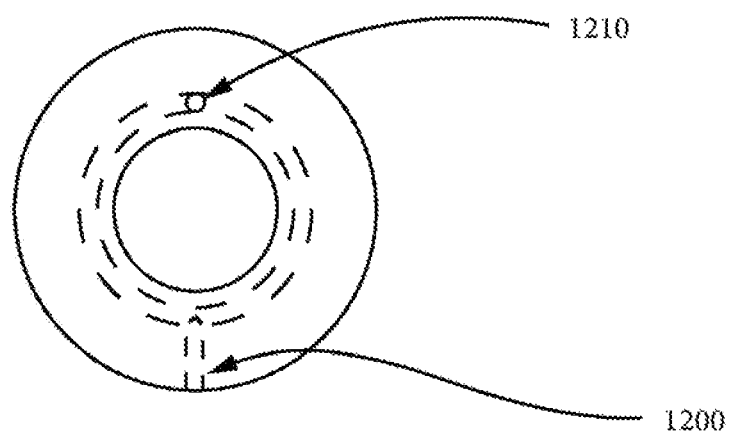
FIG. 14 shows a top view of a cylindrical, multi-layer, flat glass structure.
Figure 15:
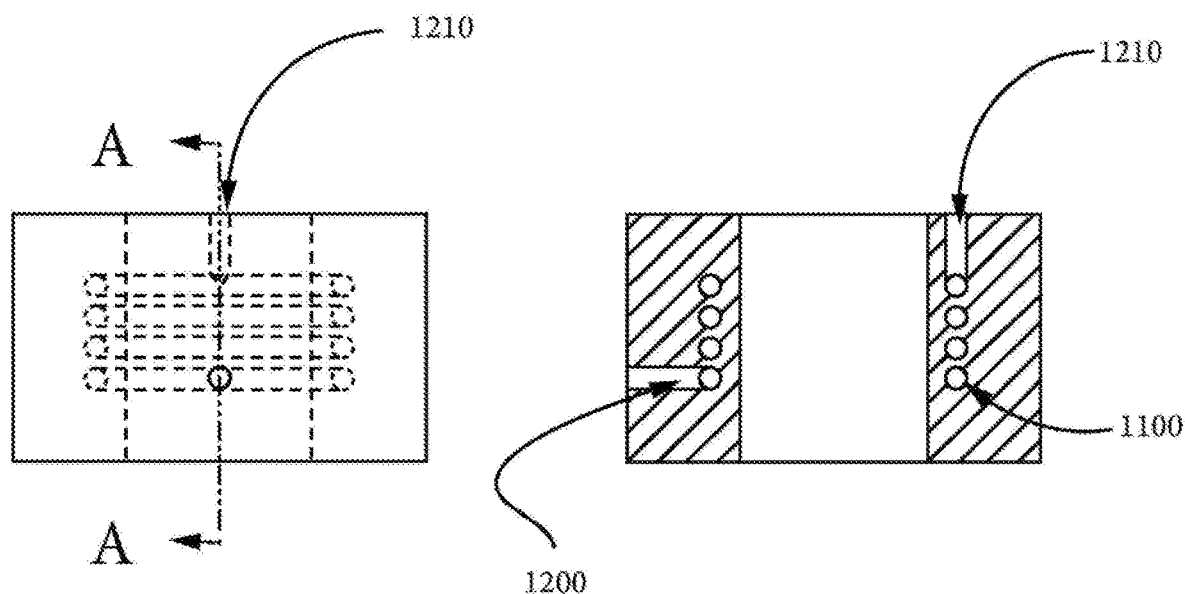
FIG. 15 shows cut away views of a cylindrical, multi-layer, flat glass structure.

In another aspect, the multi-layer, flat glass structure is a patterned, fused multi-layer roll of flat glass that is formed from a first roll of flat glass that is unrolled from a first spool, optionally cut (patterned), and then rolled onto a second spool to form a patterned, fused multi-layer of flat glass (see FIGS. 13-15). In this aspect, each "layer" as described above is a singular turn of glass in the patterned, fused, multi-layer roll (as opposed to a single, separate length of glass).

In another aspect, the present invention provides a novel patterned, fused, multi-layer, roll of flat glass: comprising:

a multi-layer roll of flat glass, comprising, at least a plurality of layers that are missing at least one portion of glass;

wherein:

the layers of flat glass are fused together; and, the roll is cylindrical.

A layer is one turn or circumference of the cylinder.

The cylindrical roll has a hollow (open) center (see FIGS. 13-14). This opening can be equivalent to the diameter of a spool, if one is used in the process of manufacture (see below).

In another aspect, a plurality of portions of glass (cut-outs) are missing from a plurality of the layers (see FIG. 15). In another aspect, a plurality of the missing glass portions in the plurality of layers are aligned to form a channel(s)(e.g., via) and/or a chamber(s).

In another aspect, the roll, comprises: at least 10 layers.
In another aspect, the roll, comprises: at least 50 layers.
In another aspect, the roll, comprises: at least 100 layers.

Figure 12:
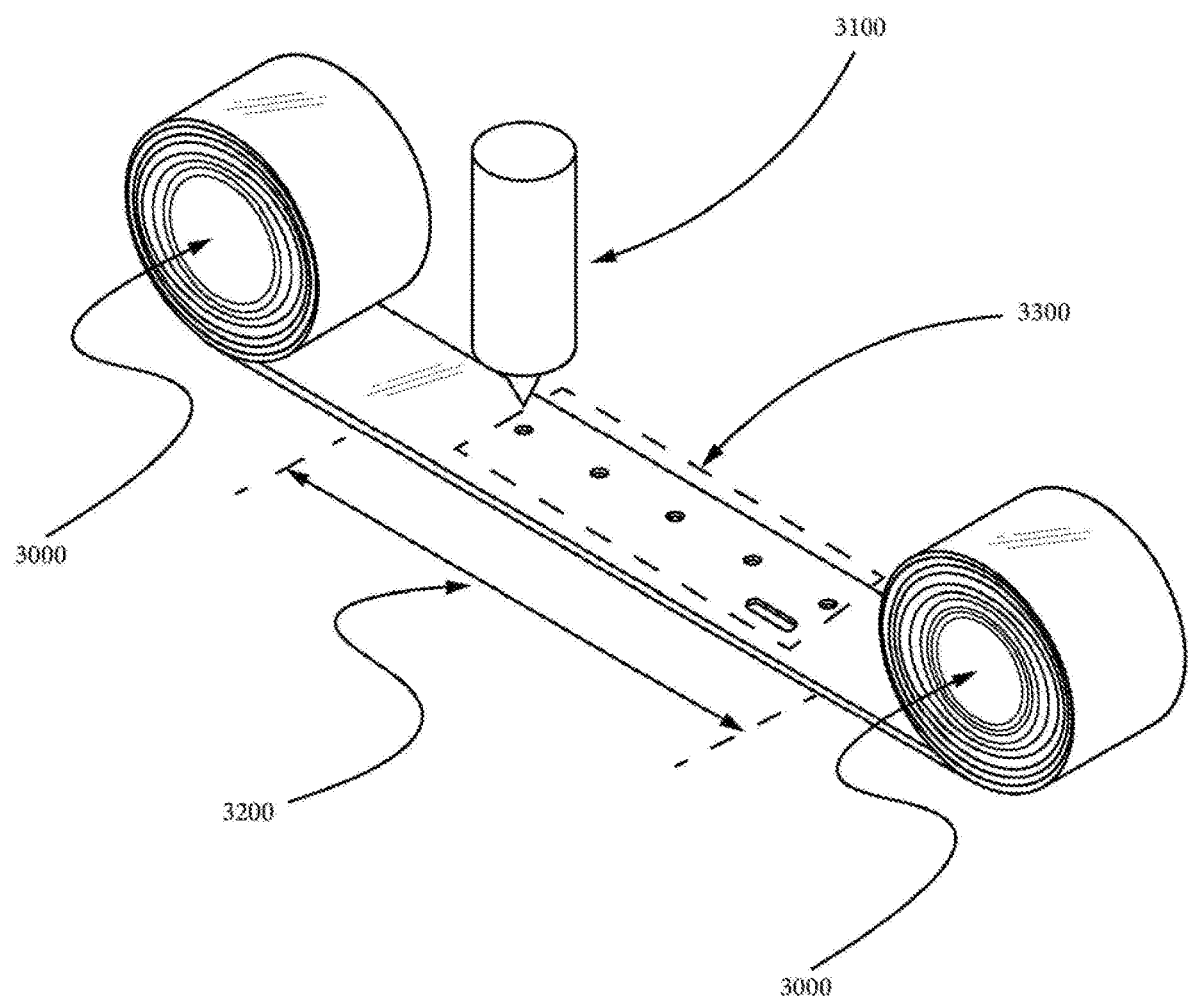
FIG. 12 shows a diagram of a reel to reel process for making a cylindrical structure.

An advantage of the cylindrical roll is that a "reel to reel" process can be used (see FIG. 12). The space between the reels is variable can be set based on the size and speed of the laser cutting 3100 and also if components are being deposited (e.g., metal deposition or soldering) onto the unrolled section prior to rolling onto the second reel.

In another aspect, the present invention provides a novel method of manufacturing a cylindrical, multi-layer, flat glass structure, the method, comprising:
(a) unrolling a length 3200 of flat glass from a first spool 3000, comprising: a first roll of flat glass;
(b) optionally cutting a desired pattern 3300 into the length of glass;
(c) rolling the optionally cut length of glass onto a second spool 3000 to form a second roll;
(d) repeating steps (a)-(c) until the desired structure is formed by the second roll;
(e) optionally, cutting away the remainder of the first spool from the second spool and optionally rolling any remainder onto the second roll;
wherein at least one portion of glass is missing from a plurality of the layers.

In the cylindrical structure, the flat glass has a plane curve shape (e.g., has been wound around a spool).

In another aspect, the process of rolling the glass onto the second spool causes it to fuse to adjacent layers of the roll.

In another aspect, the cylinder is formed from one, continuous piece of flat glass. In another aspect, the cylinder comprises flat glass having a plurality of thickness (e.g., 2, 3, 4, 5, or 6 different thickness). For a cylinder with a plurality of thicknesses, the first thickness comes from the first roll used to make the cylinder, the second thickness comes from a second roll, the third thickness, if present, comes from a third roll. This is accomplished by using a first roll, then continuing the rolling with the next roll. The ends of the first roll and beginning of the next roll can be touching or a space can be left. This is repeated for each subsequent roll.

In another aspect, the cylinder comprises: two thicknesses of glass (e.g., an inner roll having a first thickness of flat glass and an outer roll having a second thickness of flat glass).

In another aspect, the cylinder comprises: three thicknesses of glass (e.g., an inner roll having a first thickness of flat glass, a middle roll having a second thickness of flat glass, and an outer roll having the same thickness as the first thickness of flat glass).

The inner diameter (I.D.) of the cylinder is dependent upon the flexibility of flat glass used (mm, cm, m, etc.). The outer diameter (O.D.) of the cylinder is dependent upon the desired characteristics of the cylinder (mm, cm, m, etc.).

In another aspect, the method, further comprises:
(a) installing one or more components into a cavity formed by at one or more internal layers.

Installing (of components noted above) can occur at any time during the rolling onto the second spool. It can also occur multiple times in order to assemble a multi-component system. Cavity includes individual or multiple small holes (e.g., channel(s) and via(s)) and individual or multiple larger cut-outs (e.g., circular, square, and rectangular openings), which can form a chamber(s).

The remainder of the description of non-cylindrical multi-layer, flat glass structures applies to the cylindrical structures (except where incompatible with a cylindrical structure).

Numerous modifications and variations of the present invention are possible in light of the above teachings. It is therefore to be understood that within the scope of the appended claims, the invention may be practiced otherwise that as specifically described herein.

What is claimed is:

1. A method of manufacturing a stacked multi-layer structure comprising lengths of flexible flat glass, said method comprising:
(a) unrolling an initial length of flat glass from a roll of continuous fiat glass disposed around a spool;
(b) cutting away a portion of glass in a desired pattern cut-out, said pattern cut-out comprising at least one hole cut through the thickness of the initial length of fiat glass, wherein the desired pattern cut-out is disposed in the plane of the initial length of flat glass;
(c) cutting the initial length of flat glass from the roll, thereby separating the roll of continuous flat glass from the initial length of flat glass and forming an initial layer of flat glass;
(d) unrolling a subsequent next length of fiat glass from the roll of continuous flat glass;
(e) cutting away a portion of the subsequent next length of fiat glass in a desired pattern cut-out, said pattern cut-out comprising at least one hole cut through the thickness of the subsequent next length of flat glass, wherein the at least one hole cut through the thickness of the subsequent next length of flat glass is at least partially overlapping the at least one hole cut through the thickness of the previous layer of flat glass when the subsequent layer is stacked on the previous layer;
(f) cutting the subsequent next length of flat glass from the roll, thereby separating the roll of continuous flat glass from the subsequent next length of flat glass and forming a subsequent next layer of flat glass;
(g) stacking the subsequent next layer of flat glass onto the previous layer of flat glass;
(h) fusing the subsequent next layer of flat glass to the previous layer of flat glass thereby forming a unitary flat glass structure;
(i) repeating steps (d)-(h) to add a desired number of subsequent next layers, wherein each layer of flat glass becomes a previous layer of flat glass as the subsequent next layer is added; and
(j) wherein the unitary stacked flat glass structure comprising a plurality of stacked layers defines a cavity comprising a column extending along a curvilinear pathway formed by the overlapping holes through the stacked layers.

2. The method of claim 1, wherein at least one portion of flat glass is missing from each of the plurality of stacked layers.

3. The method of claim 1, wherein at least one portion of flat glass is missing from at least one of the plurality of stacked layers.

4. The method of claim 1, wherein the unitary stacked flat glass structure further comprises at least one inlet port, at least one outlet port and a pathway connecting the at least one inlet port and the at least one outlet port.

5. The method of claim 1, wherein the previous length of flat glass and the subsequent next length of flat glass are equal lengths.

6. The method of claim 1, wherein the lengths of each of the plurality of stacked layers of flat glass are equal.

7. The method of claim 1, wherein the steps (b) and (e) of cutting away a portion of glass in a desired pattern cut-out further comprises cutting with a laser.

8. The method of claim 1, wherein the step (g) of stacking the subsequent next layer of flat glass onto the previous layer of flat glass further comprises 3 aligning the desired pattern cut-out of the subsequent next layer of glass with the desired pattern cut-out of the previous layer of flat glass.

9. The method of claim 1, wherein (i) repeating steps (d)-(h) to add a desired number of subsequent next layers further comprises aligning the desired pattern cut-out of each subsequent next layer of flat glass with the desired pattern cut-out of the previous layer of flat glass.

10. The method of claim 1, further comprising a depositing step performed after the step (b) of cutting away a portion of glass in a desired pattern cut-out wherein a component is deposited on the layer of flat glass.

11. The method of claim 1, further comprising a depositing step performed after the step (e) of cutting away a portion of glass in a desired pattern cut-out wherein a component is deposited on the layer of flat glass.

12. The method of claim 1, further comprising a depositing step performed after the step (e) of cutting away and before the step (h) of fusing wherein a component is deposited in the layer of flat glass.

13. The method of claim 1, wherein at least two desired pattern cut-outs are different shapes.

14. The method of claim 1, wherein at least two desired pattern cut-outs are different sizes.

\* \* \* \* \*